United States Patent
Bohney (10) Patent No.: US 10,062,886 B2
(45) Date of Patent: Aug. 28, 2018

(54) INTEGRATED COMPONENT CAP AND SPACER FOR BATTERY PACK

(71) Applicant: Apple Inc., Cupertino, CA (US)

(72) Inventor: Nathan J. Bohney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 14/991,638

(22) Filed: Jan. 8, 2016

(65) Prior Publication Data

US 2017/0069892 A1   Mar. 9, 2017

Related U.S. Application Data

(60) Provisional application No. 62/214,448, filed on Sep. 4, 2015.

(51) Int. Cl.
| | |
|---|---|
| *H01M 2/02* | (2006.01) |
| *H01M 2/10* | (2006.01) |
| *H01M 2/14* | (2006.01) |
| *H01M 2/20* | (2006.01) |
| *H01M 10/0525* | (2010.01) |
| *H01M 10/30* | (2006.01) |
| *H01M 10/42* | (2006.01) |

(52) U.S. Cl.
CPC ............ *H01M 2/14* (2013.01); *H01M 2/028* (2013.01); *H01M 2/105* (2013.01); *H01M 2/1061* (2013.01); *H01M 2/204* (2013.01); *H01M 10/0525* (2013.01); *H01M 10/30* (2013.01); *H01M 10/425* (2013.01); *H01M 2220/30* (2013.01)

(58) Field of Classification Search
CPC ...... H01M 2/14; H01M 2/105; H01M 2/1061; H01M 2/028; H01M 2/204; H01M 10/0525; H01M 10/30; H01M 10/425
USPC ........................................ 429/7, 163
See application file for complete search history.

(56) References Cited

U.S. PATENT DOCUMENTS

| | | | |
|---|---|---|---|
| 8,778,518 B2 | 7/2014 | Baek | |
| 2005/0112415 A1* | 5/2005 | Takeshita | H01M 2/0215 429/7 |
| 2009/0087734 A1* | 4/2009 | Akatsuchi | H01M 2/0404 429/178 |
| 2010/0143788 A1* | 6/2010 | Koh | H01M 2/0404 429/163 |
| 2012/0121942 A1 | 5/2012 | Kim | |
| 2012/0328920 A1* | 12/2012 | Takase | H01M 2/1077 429/90 |
| 2013/0115490 A1 | 5/2013 | Kim et al. | |
| 2014/0295220 A1 | 10/2014 | Mori et al. | |
| 2014/0308549 A1 | 10/2014 | Shimizu et al. | |
| 2015/0086860 A1 | 3/2015 | Yokoi et al. | |

* cited by examiner

*Primary Examiner* — Sean P Cullen
(74) *Attorney, Agent, or Firm* — Polsinelli PC (57) ABSTRACT

A battery pack is disclosed. The battery pack includes a cell with a spacer, and a cap mounted on the spacer. The spacer and cap are mated to form a cavity to accommodate the components (i.e. busbars, circuit board, an insulator) of the battery pack. The spacer and cap have a series of mating surfaces for the components, wherein the mating surfaces have different heights to be recessed relative to each other to create spaces for accommodating the components. The recesses, channels, steps and raised portions correspond in geometry to the components so that they can be assembled while removing the tolerance accumulation associated with multiple standoffs.

16 Claims, 9 Drawing Sheets

INTEGRATED COMPONENT CAP AND SPACER FOR BATTERY PACK

FIELD

The described embodiments relate generally to a battery pack. More particularly, the present embodiments relate to a battery pack having a cap and spacer for integrating the battery components.

BACKGROUND

As the technology for portable devices, such as laptop computers, tablets, electronic-book readers, portable web-browsers, mobile phones, fitness trackers and smart watches, has developed and the use of portable devices has increased, the demand for secondary or rechargeable batteries for use as an energy source has increased.

Secondary or rechargeable batteries are often used in the form a battery pack. A battery pack can include the battery cells as well as protection devices, electronic circuits, interconnections and connectors. The design of the package or housing of the battery pack depends on the components it has to accommodate and the physical protection it has to provide for them.

However, it can be important to limit the overall size or volume of the battery pack. As the battery pack is often integrated into a portable device, the space the battery pack consumes within the device limits the space for the inclusion of other components and/or can lead to an increase in the overall size the portable device.

Therefore, there is a need to streamline the size of the battery pack while still accommodating and physical protection to the components of the battery pack.

SUMMARY

In one aspect, the disclosure is directed to a battery pack that includes a cap and spacer used to house the components of the battery pack that are attached to the cell. In some embodiments, the battery pack includes a cell with a spacer and a cap mounted on the spacer. The spacer and cap are mated to form a cavity to accommodate the components (i.e., busbars, printed circuit board, an insulator) of the battery pack. The spacer and cap have a series of mating surfaces for placing the components. The mating surfaces correspond in geometry to the components so that they can be disposed thereon while removing the tolerance accumulation associated with multiple standoffs.

In some embodiments, a battery pack can include a cell having a first side, a spacer mounted to the first side of the cell having a cap mating surface, a circuit board mating surface, and a first and a second busbar mating surface, where the plurality of mating surfaces have different heights and a cap affixed to a cap mating surface of the spacer. The battery pack further can include a circuit board, wherein the circuit board is disposed on a circuit board mating surface of the spacer, and first and second busbars, where the first and second busbars are disposed on a first and a second busbar mating surface, respectively.

In other embodiments, a battery pack can include a cell having a first side with a first terminal; spacer mounted to the first side of the cell, and a first cap affixed to the spacer. The spacer can include an opening to accommodate the first terminal and a plurality of mating surfaces opposing the first side of the cell. The plurality of mating surfaces including a cap mating surface; a circuit board mating surface; and a first and a second busbar mating surface, where the plurality of mating surfaces have different heights such that the circuit board mating surface has a height that is recessed relative to a height of the cap mating surface, and the pair of busbar mating surface has a height that is recessed relative to the height of the circuit board mating surface. The battery pack further includes a circuit board, wherein the circuit boards is disposed on the circuit board mating surface of the spacer, and first and second busbars, where the first and second busbars are disposed on the first and second busbar mating surface, respectively.

In some embodiments, the height of the first and second busbar mating surfaces can be the same while in others the heights can be different.

In some embodiments, the spacer has a first side and a second opposing side, wherein the first side of the spacer is mounted to the first side of the cell and the plurality of mating surfaces are on the second opposing side.

In other embodiments, the spacer has a first side and a second opposing side, wherein the first side of the spacer is mounted to the first side of the cell and the busbar mating surface is disposed on the first side, and wherein the cap mating surface and circuit board mating surface are disposed on the second opposing side.

In some embodiments, the space may further include an insulator mating surface. In various embodiments, the insulator mating surface have a height greater than the height of busbar mating surface and be recessed relative to the circuit board mating surface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a battery pack with a cell and a first cap and spacer positioned between the first cap and cell. The battery pack can include a circuit board (e.g. printed circuit board) and other components such as busbars and a flex cable. The combination of the first cap and spacer can be used for housing these components (e.g., circuit board, busbars, etc.) on a battery cell. The combination of the spacer and first cap allows for isolation of the battery pack components and provides a cosmetically pleasing appearance. In some embodiments, the battery pack can also include an optional second cap and an optional overwrap to enhance the cosmetic appearance. Additionally, the first cap, second cap and overwrap can have the same color and surface finish such that the battery pack appears as a monolithic part.

The spacer includes a cap mating surface so the first cap and spacer can be connected. Meanwhile the first cap includes a corresponding spacer mating surface for connecting the cap to the spacer. In addition, the spacer can contain surfaces in which the components of the battery pack can be housed. These surfaces allow for easy assembly of the battery pack and reduce the tolerance accumulation that is associated with multiple standoffs. For example, in some embodiments, the spacer can also include a busbar mating surface, a flex mating surface, an insulator mating, or combinations thereof.

In some embodiments, a battery pack can include a cell having a first side; a spacer mounted to the first side of the cell having a cap mating surface, a circuit board mating surface, and a first and a second busbar mating surface, where the plurality of mating surfaces have different heights and a cap affixed to a cap mating surface of the spacer. The battery pack further can include a circuit board, wherein the circuit board is disposed on a circuit board mating surface of the spacer, and first and second busbars, where the first and second busbars are disposed on a first and a second busbar mating surface, respectively.

In other embodiments, a battery pack can include a cell having a first side with a first terminal, a spacer mounted to the first side of the cell, and a first cap affixed to the spacer. The spacer can include an opening to accommodate the first terminal and a plurality of mating surfaces opposing the first side of the cell. The plurality of mating surfaces including a cap mating surface; a circuit board mating surface; and a first and a second busbar mating surface, where the plurality of mating surfaces have different heights such that the circuit board mating surface has a height that is recessed relative to a height of the cap mating surface, and the pair of busbar mating surface has a height that is recessed relative to the height of the circuit board mating surface. The battery pack further includes a circuit board, wherein the circuit boards is disposed on the circuit board mating surface of the spacer, and first and second busbars, where the first and second busbars are disposed on the first and second busbar mating surface, respectively.

These and other embodiments are discussed below with reference to FIGS. 1-9B. However, those skilled in the art will readily appreciate that the detailed description given herein with respect to these Figures is for explanatory purposes only and should not be construed as limiting.

Figure 1:
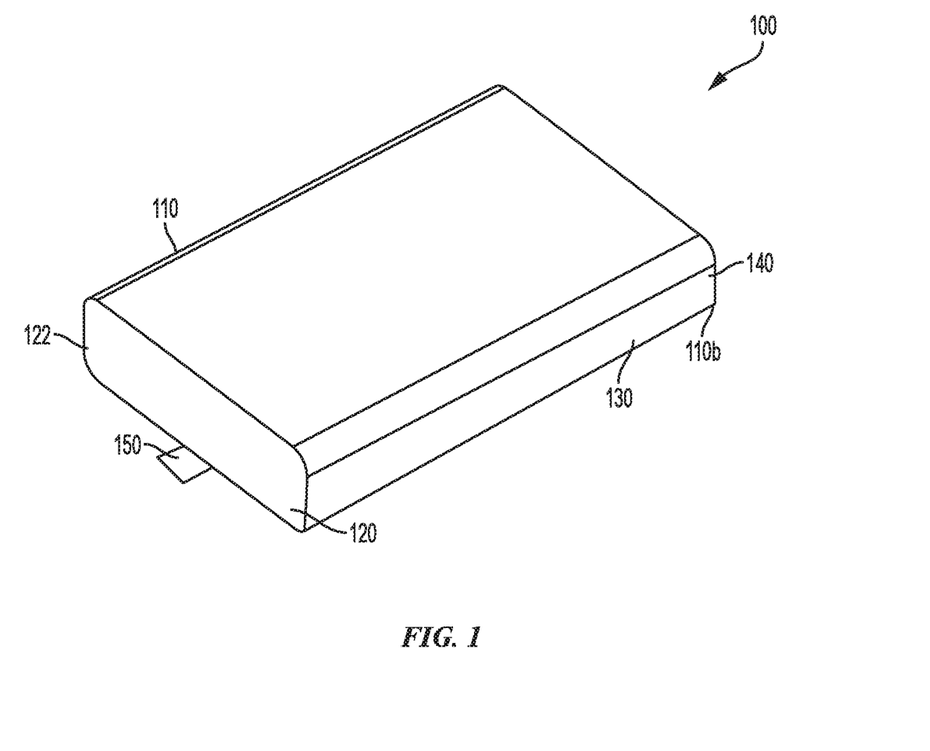
FIG. 1 shows a perspective view of a battery pack with a cap and spacer having an overwrap, in accordance with embodiments of the disclosure.
Figure 2:
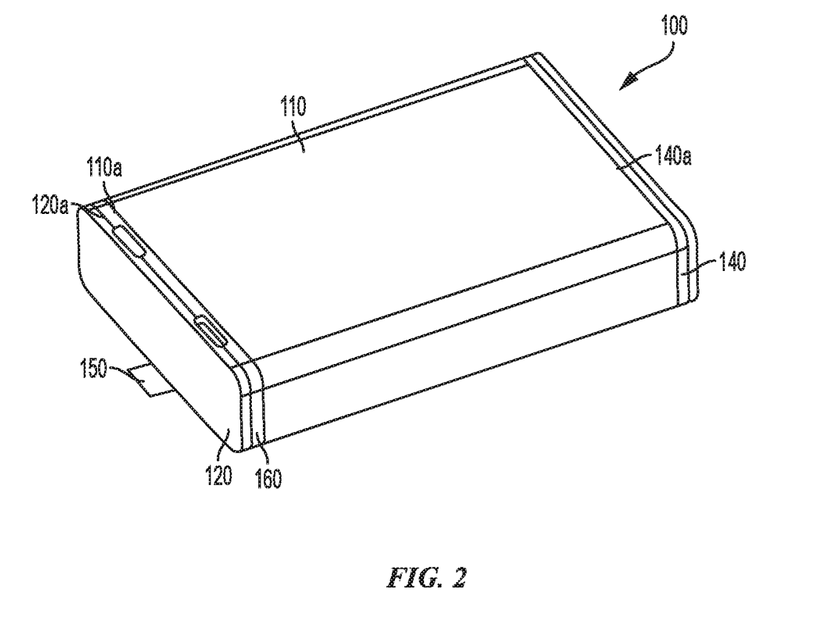
FIG. 2 shows a perspective view of the battery pack of FIG. 1 with the overwrap removed, in accordance with embodiments of the disclosure.

FIG. 1 illustrates a battery pack 100 including a cell 110 with a first cap 120, and a spacer 160 (shown in FIG. 2). Battery pack 100 can include cell 110, which is a secondary or rechargeable battery. Cell 110 can be an off-the-shelf battery cell. In some embodiments, the battery cell can be a Li-ion battery cell, nickel cadmium (NiCd) battery cell, lithium polymer battery cell, or any other known battery chemistry that is suitable for use as a secondary or rechargeable battery. The cell can be a canned cell or a pouched cell in some embodiments. The first cap 120 and spacer 160 can be used with different shaped cells. For example, in some embodiments, the cell can be a prismatic cell, a cylinder cell, or any other shaped cell.

The first cap 120 can be connected to the cell 110 by mounting onto the spacer 160 that is affixed to a first side 110a of the cell. When the cap is mounted to the spacer, a cavity is formed that can house the components of the battery pack 100.

Also, as shown in FIG. 1, the battery pack 100 can include an overwrap 130, a second cap 140, and a flex cable 150. The overwrap 130 and second cap 140 are optional and in some embodiments the battery pack may not include one or both of them.

The overwrap 130 is an insulating sheet that can be wound around the outer circumferential surface of the cell 110, the first cap 120, the second cap 140, and the spacer 160. The overwrap 130 can be coated with an adhesive on a surface that contacts the outer circumferential surface of the surface of the cell 110, the first cap 120, the second cap 140, and the spacer 160 to affix the overwrap 130 to the battery pack 100.

The overwrap 130 can extend the length of the battery pack 100 from the first cap to the second cap (i.e., cap to cap). In other words, the overwrap 130 extends from an edge of the second cap 140 to the edge of first cap 120, thereby bridging the gap or interface 140a between the second cap and cell 110 and the interface 120a between the cap and spacer 160 (as shown in FIG. 2). In embodiments that do not include the optional second cap, the overwrap 130 can extend from an edge of the first cap to a second side 110b of the cell (i.e., cap-to-end). In some embodiments, the overwrap 130 can provide a seamless appearance to the battery pack as the interfaces between the cell and the spacer and the spacer and the first cap are covered by the overwrap 130.

The appearance of battery pack 100 can further be enhanced by color matching and/or surface texture matching of the overwrap 130 with the first cap 120 and the second cap 140, such that battery pack 100 appears to be a monolith. For example, by way of illustration without intending to be limiting, in some embodiments, the overwrap 130 can have a matte black finish that visually matches the color and surface texture of the first cap 120 and second cap 140. Because the overwrap 130 visually matches the first cap 120 and the second cap 140 and the interfaces 120a and 140a are covered, the pack has a uniform circumferential surface and appearance of a unitary single piece. Other colors and surface finishes and/or textures are possible for the overwrap.

In some embodiments, the overwrap 130 can be insulating. The overwrap can be made from a polymer sheet (e.g. polyimide, polypropylene, polyethylene), an insulating tape, or other suitable insulating material.

As illustrated, the optional second cap 140 can be connected to a side of the cell 110 to be opposing the first cap. The second cap can be connected to the cell by means of an adhesive, such as double-sided tape. In some embodiments, the cell 110 can also include a weld plate (not shown) on the bottom. In such embodiments, the second cap 140 can be connected to the cell via the weld plate of the cell.

As illustrated, the battery pack 100 can also have flex cable 150. The flex cable 150 may have one or more connectors. In some embodiments, the flex cable can be directly connected to a circuit board. In other embodiments, the flex cable can have an the internal connector that connects the battery internally to the system it is powering and/or the external connector which connects the battery pack to a peripheral component that is external to the system in which the battery pack is housed. In other embodiments, the battery pack may only include an internal connector to the system. In other embodiments, the battery pack may include both an internal connector and an external connector. An internal connector can provide an interface for electrical connection between the cell and the system. An external connector can provide an interface for connecting the battery pack to an external power source. In some embodiments, the optional internal connector and/or external connector can be any type of suitable electrical connector. For example, the external connecter can be a USB-C port that can connect the battery pack to a USB-C power adapter. In other embodiments, the external connector can be any other known port suitable for electrically connecting the battery pack to an external component.

Battery pack 100 also includes first cap 120 that is mounted onto the spacer 160, as shown in FIG. 2, to receive the components (e.g. busbar, circuit board, insulator, etc.) that are attached to the cell. The first cap 120 can be mated to the spacer 160 to provide a cavity in which the components (busbars, circuit board, flex cable, insulator, etc.) of the battery pack can be located. The first cap 120 can be a thin plate that covers the face of the battery pack 100.

Figure 3A:
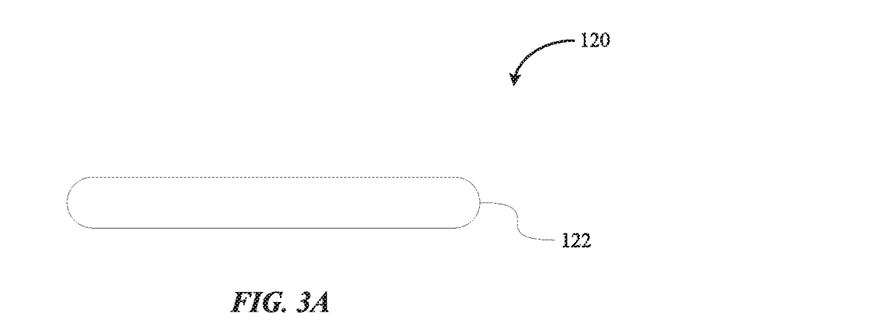
FIG. 3A shows a front view of an exterior surface of the cap of the battery pack, in accordance with embodiments of the disclosure.
Figure 3B:
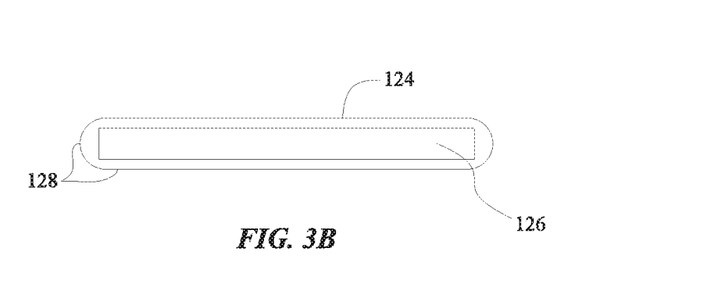
FIG. 3B shows a rear view depicting an interior surface of the cap of the battery pack, in accordance with embodiments of the disclosure.

FIGS. 3A and 3B depict exploded views of the exterior and interior surfaces of first cap 120. As illustrated in FIG. 3A, first cap 120 has an exterior surface 122 that is a flat uniform surface. Exterior surface 122 form an exterior surface of the battery pack, as seen in FIG. 1. This flat uniform exterior surface 122 can also add in enhancing the cosmetic appearance to the battery pack 100. The first cap 120 also has an interior surface 124, depicted in FIG. 3B, that can be used for connecting the first cap with the spacer.

As shown in FIG. 3B, in some embodiments, the interior surface 124 includes a component mating surface that is surrounded by a spacer mating surface 128. In some embodiments, the component mating surface 126 can provide tolerance for receiving the components, such as busbars, a circuit board, or an insulator. In such instances, the component mating surface 126 and spacer mating surface 128 can have different heights. For example, the spacer mating surface 128 can be a perimeter edge that has a height greater than the component mating surface 126. Meanwhile, the component mating surface 126 is lower in height such that it acts a channel that can house the components of the battery pack. In such embodiments, spacer mating surface 128 can connect the first cap to the spacer while locking around the components. In other embodiments, rather than using a component mating surface to provide a tolerance for housing a portion of the components of the battery back, the spacer can provide the tolerance for housing the components. In such embodiments, the component mating surface 126 and the spacer mating surface 128 may be the same height such that the interior surface 124 is flat.

Figure 3C:
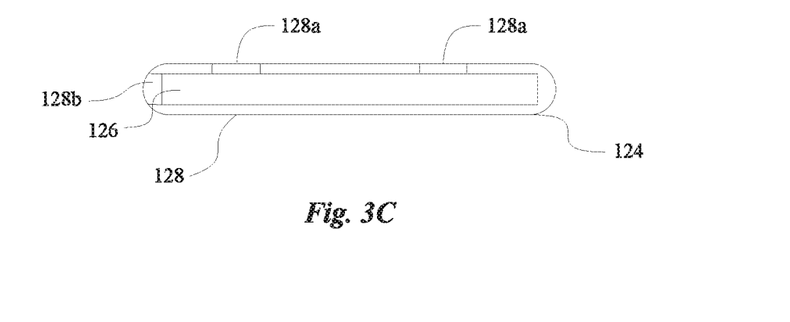
FIG. 3C shows a rear view depicting an interior surface of the cap of the battery pack, in accordance with embodiments of the disclosure.

In some embodiments, the cap can also include optional channels 128a in portions of the spacer mating surface 128 to accommodate some of the components, as shown in FIG. 3C. As illustrated in FIGS. 2 and 3C, channels 128a can provide additional space for the busbars 192.

When assembled, the first cap 120 is mounted and affixed to the spacer 160. In affixing the first cap 120 to the spacer 160, the first cap 120 is mated to align with the spacer 160. As illustrated in FIG. 2, the first cap 120 is aligned with the spacer 160 such that the perimeter (i.e. circumferential) edges of the first cap 120 match with the perimeter edges of the spacer 160.

To aid in mating the first cap 120 with the spacer 160, in some embodiments, the cap may also include an optional guide portion 128b for adding in aligning the spacer mating surface 128 of the first cap with the cap mating surface 168 of the spacer 160. In some instances, the guide portion 128b can have a height greater than the height of the spacer mating surface 128 and may correspond to a mating surface in the spacer. In other embodiments, the spacer mating surface 128 and the component mating surface 126 may be the same height such that the interior surface 124 is a flat surface. In some embodiments, as depicted in FIG. 3C, the guide portion 128b can be on a lateral side of the first cap 120 to correspond to a busbar mating surface 162 in the spacer 160. In other embodiments, the guide portion can be positioned on the perimeter of the cap in other locations to correspond to other surfaces in the spacer 160. For example, without intending to be limiting, in some embodiments, the guide portion can be positioned to correspond to a flex cable channel 165 in the spacer. Other locations along the spacer mating surface 128 are possible.

In some embodiments, the first cap 120 can be affixed to the spacer 160 using an adhesive. Any adhesive may be used that can withstand high temperature (e.g. 65° C.) and high humidity (e.g. 90% humidity) while maintaining reliability (i.e. retaining adhesive properties) and meeting the safety standards for the battery. In other embodiments, the first cap 120 can include snap and lock features for mating and affixing to the spacer. Other methods for affixing the first cap 120 to the spacer 160 are also possible.

Figure 4:
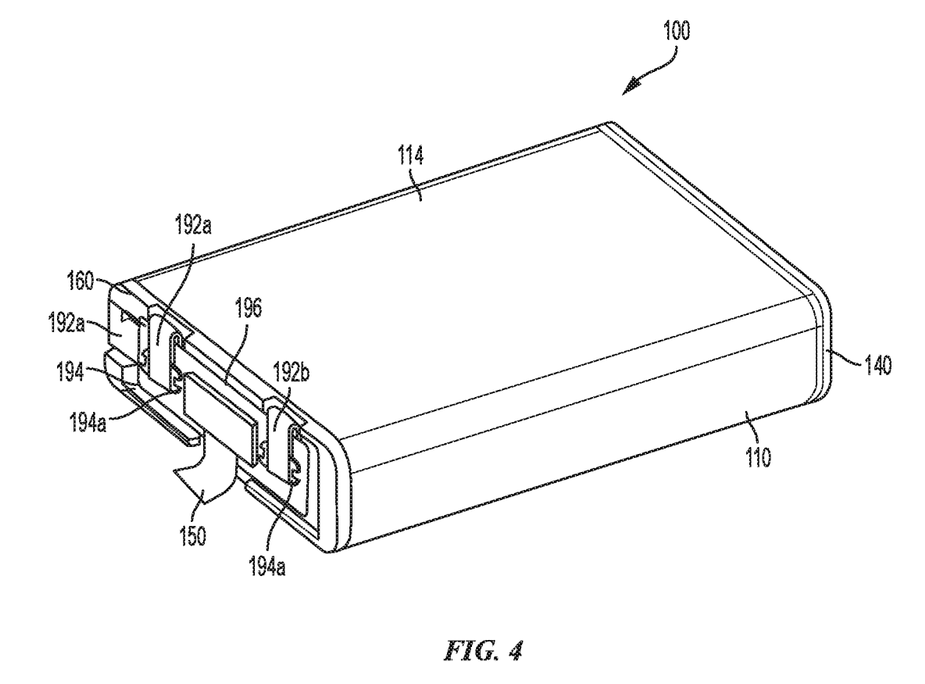
FIG. 4 shows a perspective view of the battery pack in FIG. 1 in a partially dissembled state with the cap removed, in accordance with embodiments of the disclosure.

Now referring to FIG. 4, the figure illustrates battery pack 100 in a partially disassembled state with the first cap 120 removed, depicting the components that can be attached to the cell. As illustrated, the battery pack includes busbars 192a and 192b, circuit board 194, an insulator 196 and a flex cable 150. Although busbars 192a and 192, circuit board 194, insulator 196 and flex cable 150 are depicted, they are by way of illustration and not intended to be limiting. In other embodiments, some of these components may not be included and/or other components may be added.

Figure 6:
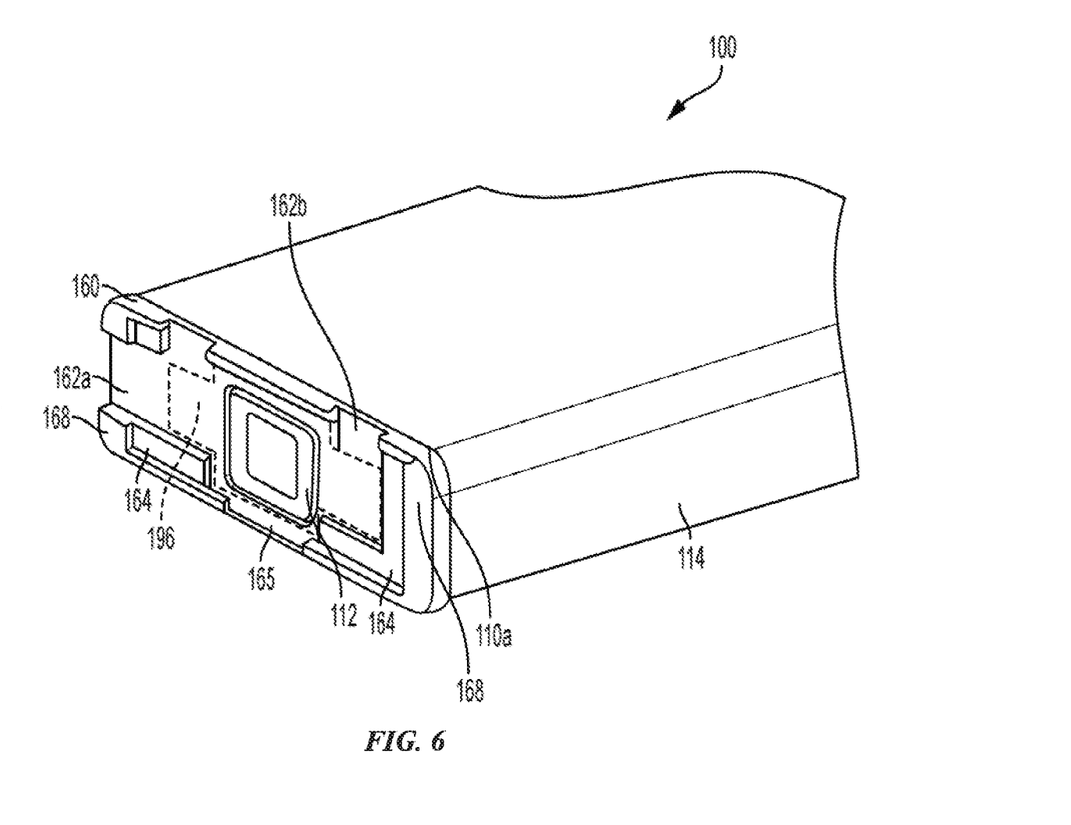
FIG. 6 shows a perspective view of the battery pack in FIG. 1 in a partially assembled state with the spacer mounted to the cell, in accordance with embodiments of the disclosure.

As shown in FIG. 6, the cell 110 has a single terminal 112 on first side 110a. In such embodiments, for example, the terminal 112 can be a negative or positive tab while the housing (e.g., can) of the cell can act as the opposite terminal. In such embodiments, the terminal 112 can be insulated from the remainder of the cell's housing. In other embodiments, the cell may include two distinct terminals, each of which is separate from the cell's housing. In some embodiments, the distinct terminals may both be included on the same side of the cell, while in other embodiments, the terminals may be on different sides of the cell. By way of example without intending to be limiting, terminal 112 can be a negative terminal while a positive terminal can be located at the opposite end of the cell.

As illustrated in FIGS. 4 and 6, the cell 110 includes a terminal 112 on the first side 110*a*, while the cell housing 114 acts as an opposite terminal. In such embodiments, a busbar can be connected to a portion of the cell's housing. For example, a busbar 192*a* is connected to the housing of the cell while busbar 192*b* is connected to terminal 112 (seen in FIG. 6). As illustrated, busbar 192*a* can extend from terminal (located at the opposing bottom end of the cell) along a lateral side of the cell housing 114. In embodiments, having a busbar extending along a lateral side of the cell housing 114, a primary wrap can be used to secure the busbar to hold it against the cell housing 114. Like the overwrap, the primary wrap can be an insulating sheet. The primary wrap can be made from a polymer sheet (e.g. polyimide, polypropylene, polyethylene), an insulating tape, or other suitable insulating material. In some embodiments. The primary wrap can be the same material as the overwrap 130, while in other embodiments, the primary wrap and overwrap may be different materials. The primary wrap may be adhered with an adhesive.

As depicted in FIG. 4, the busbars 192*a* and 192*b* are flexible and can be folded around the sides of the circuit board 194.

The circuit board 194 provides a low profile and aids in minimizing the size (i.e., volume) of the battery pack. It is advantageous to minimize the overall volume of the battery pack to reduce the space requirements necessary for accommodating the pack within the system (e.g., laptop computer, tablet, cellphone, etc.). The circuit board 194 can include weld pads 194*a*. The busbars 192*a* and 192*b* can be connected to the circuit board 194 via the weld pads 194*a*. The circuit board 194 additionally includes the electrical circuitry for the battery pack. The circuit board 194 can also include the safety protection circuitry for the battery pack. For example, without intending to be limiting, in some embodiments, the circuit board 194 can include a charge and discharge protection circuit and/or a sensing circuit for detecting information regarding current and/or voltage. Other types of circuitry are possible for inclusion on the circuit board. In some embodiments, the circuit board can be a printed circuit board. In some embodiments, the circuit board can be a flexible printed circuit board, or any other suitable type of circuit board.

During assembly, the busbars can initially be connected to the cell via a terminal or the housing at a first end and in a position such that a second opposing end extends outward away from the spacer. The circuit board 194 can be welded to the opposing second ends of the busbars via the weld pads. To provide some rigidity to the circuit board for easy welding, in some embodiments, the circuit board can have an optional stiffener on a surface opposing the weld pads 194*a*. Once the circuit board and busbars have been connected via a welding process, the assembly of the busbars and circuit board can pivot and be folded down into the spacer.

Figure 5:
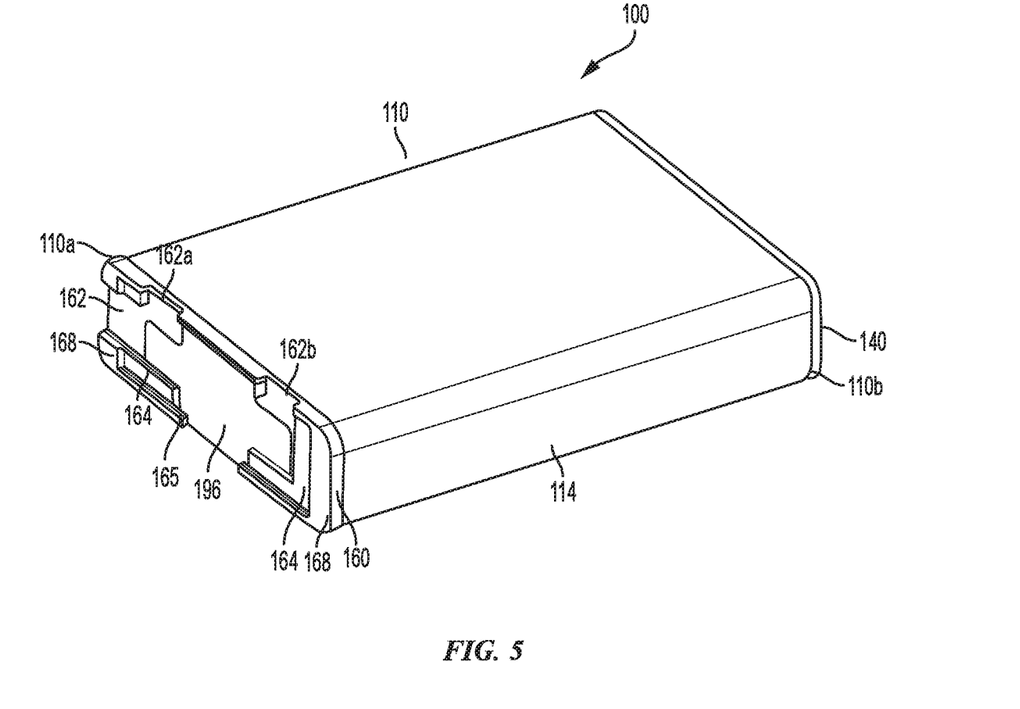
FIG. 5 shows a perspective view of the battery pack in FIG. 1 in a partially assembled state with the spacer and insulator mounted to the cell, in accordance with embodiments of the disclosure.

As shown in FIGS. 5 and 6, the spacer 160 has a number of mating surfaces for receiving the components (e.g., circuit board 194 and busbars 192) of the battery pack. The spacer 160 includes a first mating surface that is the cap mating surface 168 that contacts the spacer mating surface 128 of the first cap 120. The spacer 160 also includes a circuit board mating surface 164 that contacts a surface of the circuit board 194. The spacer also includes busbar mating surfaces 162*a* and 162*b* that contact a surface of the busbars 192*a* and 192*b*. These mating surfaces can have different heights to provide tolerances for accommodating the components of the battery pack. By way of illustration, the circuit board mating surface 164 is recessed relative to the cap mating surface 168 and the busbar mating surfaces 162*a* and 162*b* are recessed relative to the circuit board mating surface 164. It should be appreciated that in some embodiments, the busbar mating surfaces 162*a* and 162*b* can be at the same height, while in other embodiments, busbar mating surfaces 162*a* and 162*b* may be at different heights.

The spacer 160 also includes a terminal opening 163 for accommodating the terminal 112 of the cell 110. As illustrated in FIG. 8, the cell 110 has a terminal 112 protruding from first side 110*a*. The opening 163 (seen in FIG. 7) in the spacer can accommodate and surround the terminal 112 of the cell 110. As such, the spacer 160 can be mounted to the first side 110*a* of the cell to insulate the terminal 112. In other embodiments, the spacer can include two terminal openings if both the positive terminals are located on a front side of the cell. In still other embodiments, the space may not include a terminal opening, if the terminals are located on bottom side of the cell.

Figure 7:
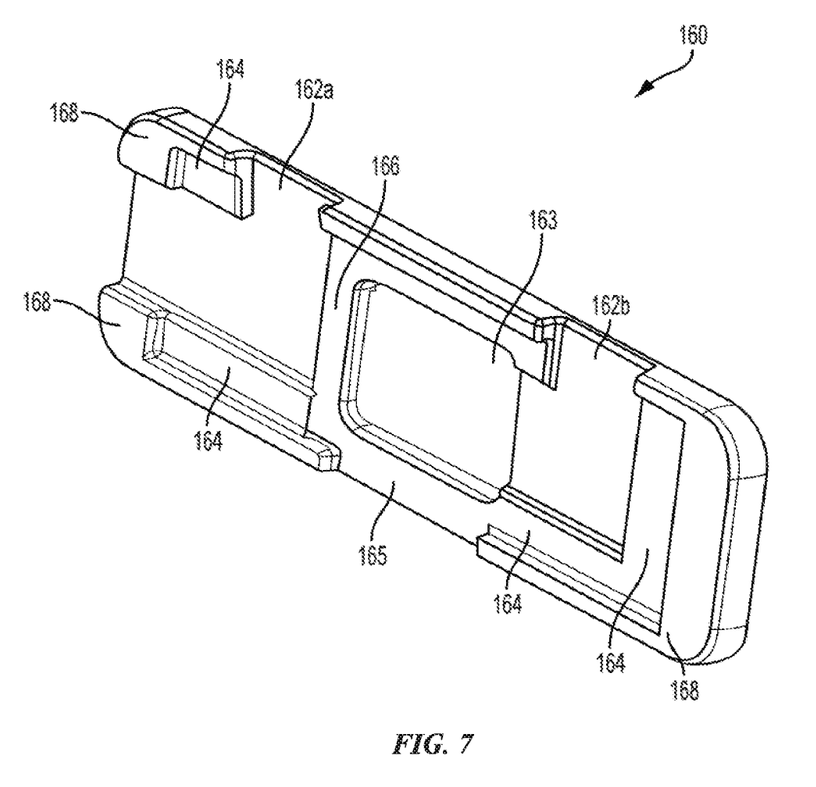
FIG. 7 shows a front perspective view of a spacer for a battery pack, in accordance with embodiments of the disclosure.
Figure 8:
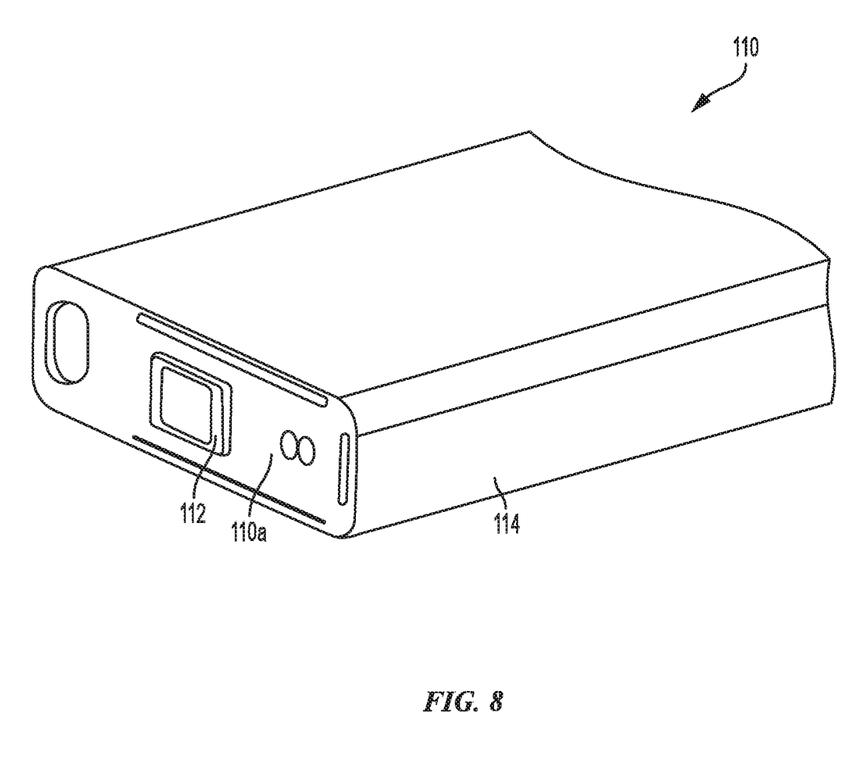
FIG. 8 shows a perspective view of a cell that can be incorporated into the battery pack of FIG. 1, in accordance with embodiments of the disclosure.

As shown in FIGS. 6 and 7, the spacer 160 can also an optional insulator mating surface 166 for accommodating an optional insulator 196. In such embodiments, the insulator mating surface 166 can be recessed relative to the circuit board mating surface 164 and have a height greater than the busbar mating surfaces 162*a* and 162*b*.

In some embodiments, the optional insulator 196 can disposed between the circuit board 194 and the terminal 112, as seen in FIG. 4. The insulator 196 can electrically insulate the negative components from the positive components to prevent internal shortening of the battery pack. In some embodiments, the optional insulator 196 is an insulation film that can comprise any suitable insulation material. For example, without intending to be limiting, in some embodiments, the insulator can be a polyimide (PI) film, a polypropylene (PP) film, a polyethylene (PE) film, or any other insulator film suitable for use in a battery pack.

As can be seen in FIGS. 5-7, the mating surfaces of the spacer 160 can be used for accommodating the components of the battery pack. The busbar mating surfaces 162*a* and 162*b* can be used to accommodate the busbars 192*a* and 192*b*. The busbars 192*a* and 192*b* can be positioned against the busbar mating surfaces 162*a* and 162*b*, such that at least a portion of the busbars 192*a* and 192*b* are recessed relative to the circuit board mating surface 164. In other embodiments, if the spacer includes an insulator mating surface 166, the busbars 192*a* and 192*b* can be positioned against the busbar mating surfaces 162*a* and 162*b*, such that at least a portion of the busbars 192*a* and 192*b* are recessed relative to the insulator mating surface 166.

As such, the busbar mating surfaces 162*a* and 162*b* are shaped to correspond to the shape or geometry of the busbars 192*a* and 192*b*. In other words, the busbars can be nested in the busbar mating surfaces 162*a* and 162*b*. In some embodiments, to allow the busbars 192 to nest in the busbar mating surfaces 162*a* and 162*b*, the busbar mating surfaces 162*a* and 162*b* can be recessed a height relative to the circuit board mating surface 164 (or the insulator mating surface 166) that is equal to the thickness of the busbars. In some embodiments, the busbar mating surfaces 162*a* and 162*b* can be recessed a height relative to the circuit board mating surface 164 (or the insulator mating surface 166) that is equal to the thickness of the busbars the plus the thickness of an adhesive layer that is used for securing the busbars 192 to the busbar mating surfaces 162*a* and 162*b*. As can be seen in FIGS. 5-7, the spacer includes optional insulator mating surface 166 for accommodating the optional insulator. In such instances, the insulator 196 can be positioned against the insulator mating surfaces 166. The insulator 196 (depicted in outline in FIG. 6) can be disposed on the insulator mating surface 166 to be positioned between the circuit board 194 and the terminal 112, thereby electrically isolating the circuit board from the terminal 112.

In some embodiments, when the busbars 192 are positioned against the busbar mating surfaces 162, the busbars 192 and busbar mating surfaces may each have a height that when the busbars 192 positioned in the busbar mating surfaces 162 the busbars form a level plane relative to the insulator mating surface). In other embodiments, the busbars may be thinner or thicker than the recess height difference between the busbar mating surfaces 162 and the insulator mating surface 166.

The circuit board mating surface 164 can be used to accommodate the circuit board 194. The circuit board 194 can be positioned against the circuit board mating surface 164, such that at least a portion of the circuit board 194 is recessed relative to the cap mating surface 168. In some embodiments, when the circuit board 194 is positioned against the circuit board mating surface 164, the circuit board 194 may be of a thickness such that it is flush with the cap mating surface 168. In other embodiments, the circuit board may be thinner or thicker than the recess height difference between the circuit board mating surface 164 and the cap mating surface 168.

As illustrated in FIGS. 5-7, the spacer 160 can also include flex cable channel 165 that provides a space for accommodating the flex cable 150. The flex cable channel 165 is recessed relative to the circuit board mating surface to create a space for the cable.

Figure 9A:
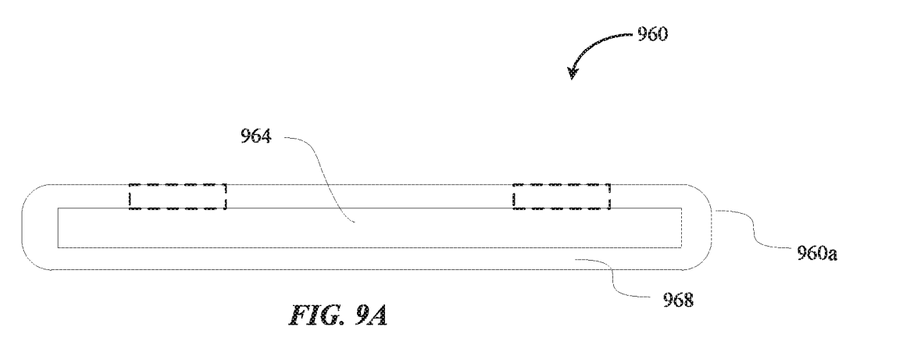
FIG. 9A shows a front view an alternative embodiment of a spacer, in accordance with embodiments of the disclosure.
Figure 9B:
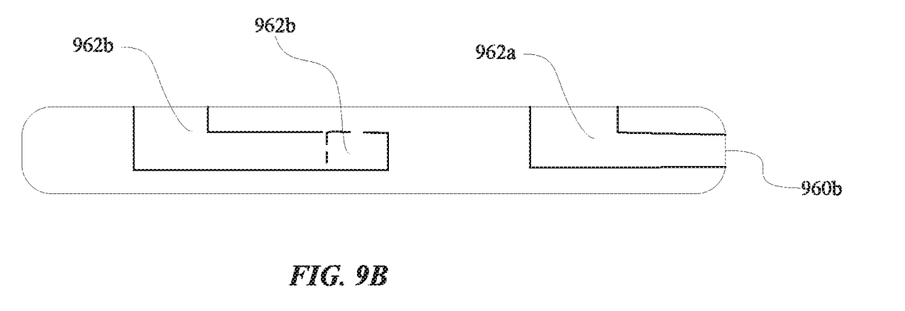
FIG. 9B shows a rear view an alternative embodiment of a spacer, in accordance with embodiments of the disclosure.

In alterative embodiments, the spacer may include a front side with component mating surfaces and a back side with component mating surfaces. In such embodiments, the spacer 960, as depicted in FIGS. 9A and 9B, includes front side 960*a* with a first mating surface that is the cap mating surface 968 that contacts the spacer mating surface 128 of the first cap 120. The front side 960*a* of the spacer 960 also includes a circuit board mating surface 964 that contacts a surface of the circuit board 194. These mating surfaces can have different heights to provide a tolerance for accommodating the circuit board of the battery pack. As such, the circuit board mating surface 164 is recessed relative to the cap mating surface 968. Similar to the previous embodiments, the circuit board mating surface 964 can be used to accommodate the circuit board 194. The circuit board 194 can be positioned against the circuit board mating surface 964, such that at least a portion of the circuit board 194 is recessed relative to the cap mating surface 968. In some embodiments, when the circuit board 194 is positioned against the circuit board mating surface 964, the circuit board 194 may be of a thickness such that it is even in height with the cap mating surface 168. In other embodiments, the circuit board may be thinner or thicker than the recess height difference between the circuit board mating surface 964 and the cap mating surface 968.

Meanwhile, in such embodiments, the spacer 960, as depicted in FIG. 9B, has a back side 960*b* that includes busbar mating surfaces 962*a* and 962*b* to accommodate the busbars. In some instances, the busbar mating surface 962*b* can be shaped to also include a space for accommodating the terminal 112. In these instances, an insulator may be positioned within the busbar mating so as to be between the busbar and the battery cell to prevent electrical connection between the busbar and the cell.

The first cap 120 and spacer 160 or 960 can both be injection molded to form the various mating surfaces for placing the battery pack components. In some embodiments, the first cap 120 and spacer 160 can be made from the same material. In other embodiments, the cap and spacer can be different materials. The cap and spacer can be made from any plastic, polymer, resin, or insulating material that is readily shaping via an injection molding process and has suitable flame retardance for use in a battery pack.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A battery pack, comprising:
 a cell having a first side;
 a spacer comprising:
  a first side and a second side, the second side disposed opposite of the first side, wherein the first side of the spacer is mounted to the first side of the cell;
  a plurality of mating surfaces including a cap mating surface, a circuit board mating surface, a first busbar mating surface, and a second busbar mating surface, wherein the plurality of mating surfaces have different heights;
  wherein the first busbar mating surface and the second busbar mating surface are formed on the first side of the spacer; and
  wherein the cap mating surface and the circuit board mating surface are formed on the second side of the spacer;
 a circuit board, wherein the circuit board is disposed on the circuit board mating surface of the spacer;
 first and second busbars, wherein the first and second busbars contact the first and second busbar mating surfaces, respectively; and
 a first cap having an interior surface affixed to the cap mating surface of the spacer.

2. The battery pack of claim 1 wherein the height of the first busbar mating surface and the height of the second busbar mating surface are different.

3. The battery pack of claim 1 wherein the circuit board is a flexible printed circuit board.

4. The battery pack of claim 1 further comprising a flex cable, wherein the flex cable is connected to the circuit board and the spacer further comprises a flex cable channel, wherein the flex cable channel has a height that is recessed relative to the height of the circuit board mating surface.

5. The battery pack of claim 1 further comprising an overwrap, wherein the overwrap is disposed around an outer circumferential surface of the cell.

6. The battery pack of claim 5 wherein the cell has a second side opposing the first side and the overwrap has a length that extends from an edge of the first cap to an edge of the second side of the cell.

7. The battery pack of claim 1 wherein the cell has a second side opposing the first side and further comprising a second cap disposed on the second side of the cell.

8. The battery pack of claim 7 further comprising an overwrap, wherein the overwrap is disposed around an outer circumferential surface of the cell and has a length that extends from an edge of the first cap to an edge of the second cap.

9. The battery pack of claim 1 further comprising:
the spacer further comprising an insulator mating surface, wherein the insulator mating surface has a height that is greater than the height of the first and second busbar mating surfaces and is recessed relative to the height of the circuit board mating surface; and
an insulator, wherein the insulator is disposed on the insulator mating surface.

10. The battery pack of claim 9 wherein the height of the first and the second busbar mating surfaces are recessed relative to the insulator mating surface such that the first and the second busbars disposed on the first and the second busbar mating surfaces, respectively, are recessed relative to insulator mating surface.

11. A battery pack, comprising:
a cell having a first side with a first terminal;
a spacer comprising:
    a first side and a second side, the second side disposed opposite of the first side, wherein the first side of the spacer is mounted to the first side of the cell;
    an opening to accommodate the first terminal;
    a plurality of mating surfaces including a cap mating surface, a circuit board mating surface, a first busbar mating surface, and a second busbar mating surface, wherein the plurality of mating surfaces have different heights such that the circuit board mating surface has a height that is recessed relative to a height of the cap mating surface;
    wherein the first and the second busbar mating surfaces are formed on the first side of the spacer; and
    wherein the cap mating surface and the circuit board mating surface are formed on the second side of the spacer;
a circuit board, wherein the circuit board is disposed on the circuit board mating surface of the spacer;
first and second busbars, wherein the first and second busbars contact the first and second busbar mating surfaces, respectively; and
a first cap having an interior surface affixed to the cap mating surface of the spacer.

12. The battery pack of claim 11 wherein the height of the first busbar mating surface and the height of the second busbar mating surface are different.

13. The battery pack of claim 11 further comprising a flex cable, wherein the flex cable is connected to the circuit board and the spacer further comprises a flex cable channel, wherein the flex cable channel has a height that is recessed relative to the height of the circuit board mating surface.

14. The battery pack of claim 11 further comprising an overwrap, wherein the overwrap is disposed around an outer circumferential surface of the cell.

15. The battery pack of claim 14 wherein the cell has a second side opposing the first side and the overwrap has a length that extends from an edge of the first cap to an edge of the second side of the cell.

16. A battery pack, comprising:
a cell having a first side;
a spacer comprising:
    a first side and a second side, the second side disposed opposite of the first side, wherein the first side of the spacer is mounted to the first side of the cell;
    a plurality of mating surfaces including a cap mating surface, a circuit board mating surface, a first busbar mating surface, and a second busbar mating surface, wherein the plurality of mating surfaces have different heights;
    wherein the first busbar mating surface and the second busbar mating surface are formed on the first side of the spacer; and
    wherein the cap mating surface and the circuit board mating surface are formed on the second side of the spacer;
a circuit board, wherein the circuit board is disposed on the circuit board mating surface of the spacer;
first and second busbars, wherein the first and second busbars contact the first and second busbar mating surfaces, respectively;
a first cap having an interior surface affixed to the cap mating surface of the spacer; and
an overwrap, wherein the overwrap is disposed around an outer circumferential surface of the battery pack and extends at least a length of the cell, a length of the spacer and a length of the first cap.

\* \* \* \* \*